United States Patent [19]

Williams et al.

[11] 4,036,588

[45] July 19, 1977

[54] METHOD OF INCREASING THE WATER ABSORPTION OF CELLULOSE-CONTAINING MATERIALS

[75] Inventors: Joel Lawson Williams, Cary; Vivian Thomas Stannett, Raleigh, both of N.C.

[73] Assignee: Research Corporation, New York, N.Y.

[21] Appl. No.: 665,181

[22] Filed: Mar. 9, 1976

[51] Int. Cl.² .................. D06M 13/20; D06M 13/30; D06M 13/34; D06M 5/24
[52] U.S. Cl. .................................. 8/130.1; 8/120; 8/125; 8/131; 8/181; 8/196; 8/DIG. 12; 8/DIG. 18; 260/17.4 GC; 260/17.4 CL
[58] Field of Search .............. 8/125, 130.1, 131, 196, 8/DIG. 18, DIG. 12, 120, 181; 260/17.4 GC, 17.4 CL, 120

[56] References Cited

U.S. PATENT DOCUMENTS

| | | | |
|---|---|---|---|
| 3,131,138 | 4/1964 | Durup et al. | 204/154 |
| 3,201,336 | 8/1965 | Magat et al. | 204/154 |
| 3,312,642 | 4/1967 | Schwenker et al. | 260/17.4 |
| 3,926,555 | 12/1975 | Reine et al. | 8/189 |

OTHER PUBLICATIONS

Graft Copolymerization of Vinylmonomers on Cotton for Improving its Serviceability, Agnihotri et al., Fibers and Polymers, 2/72, pp. 55–58.
Cellulose Graft Copolymers, Arthur, Reprint from Advances in Chemistry Series, No. 91, 1969, pp. 574–591.

*Primary Examiner*—John Kight, III
*Attorney, Agent, or Firm*—Dennis P. Clarke

[57] ABSTRACT

A process for increasing the water-absorbency of cellulose-containing materials by graft-copolymerizing onto said material a vinyl monomer containing a hydrophilic group and treating the graft-copolymerized material with a decrystallizing agent for cellulose.

17 Claims, 2 Drawing Figures

WATER SORPTION ISOTHERMS FOR
ACRYLIC ACID GRAFTED RAYON
AT 25° C

WATER SORPTION ISOTHERMS FOR
ACRYLIC ACID GRAFTED CELLOPHANE
AT 25° C

WATER SORPTION ISOTHERMS FOR
ACRYLIC ACID GRAFTED RAYON
AT 25° C

WATER SORPTION ISOTHERMS FOR
ACRYLIC ACID GRAFTED CELLOPHANE
AT 25° C

METHOD OF INCREASING THE WATER ABSORPTION OF CELLULOSE-CONTAINING MATERIALS

BACKGROUND OF THE INVENTION

The present invention relates to a method of improving the water absorbent properties of cellulose-containing material.

Numerous methods have been proposed heretofore for increasing the water absorbency or hydrophilicity of cellulose-containing materials. More recently, these efforts have centered around graft-copolymerizing onto the cellulose-containing material monomers containing hydrophilic groups. Following the graft copolymerization step, the hydrophilic groups impart to the material various degrees of water retentive properties.

In the *Journal of Applied Polymer Science*, Vol. 17 (1973) at pages 3143–3156, Lepoutre et al describe a method for increasing the water absorbency of wood pulp by grafting thereon polyacrylonitrile and subsequently hydrolizing the material to a sodium polyacrylate-polyacrylamide copolymer. Williams et al. [*Journal of Applied Polymer Science*, Vol. 10, pages 1229–1245 (1966)] describe a method for modifying the wool-water relationships by grafting techniques. U.S. Pat. No. 3,423,163 to Magat et al describes a method for increasing the moisture absorption properties of cellulose materials by graft copolymerizing thereon N-methylolacrylamide.

U.S. Pat. No. 3,252,880 to Magat et al. discloses that a base polymer may be rendered more hydrophilic by grafting thereon suitable monomeric materials. U.S. Pat. No. 3,514,385 to Magat et al. discloses the grafting of various acrylic compounds to cellulosic base materials in order to increase the hydrophilicity of the resulting product. U.S. Pat. No. 3,201,336 to Magat et al. also discloses grafting acrylic monomers onto cellulosic based materials.

While all of these methods operate to impart some degree of increased hydrophilicity to the materials treated, there has not as yet been proposed a method for drastically increasing the water absorptive properties or hydrophilicity of cellulose-based materials to the extent required in some applications of the cellulose material. For example, a high degree of water absorption is required of disposable diapers comprising cellulose materials. The preparation of catamenial receptors, surgical swabs, etc., also requires the utilization of highly absorptive cellulose materials.

SUMMARY OF THE INVENTION

The present invention provides a method for drastically increasing the water absorptive properties or hydrophilicity of cellulose-containing materials by graft co-polymerizing onto said material at least one vinyl monomer containing a hydrophilic group and treating the thus graft-polymerized material with a decrystallizing agent for cellulose in an amount and for a time sufficient to increase the water absorbency of the graft copolymerized material. It has been found that the post-decrystallization step is essential and critical in order to greatly enhance the water absorption properties of the treated material.

DETAILED DESCRIPTION OF THE INVENTION

Figure 1:
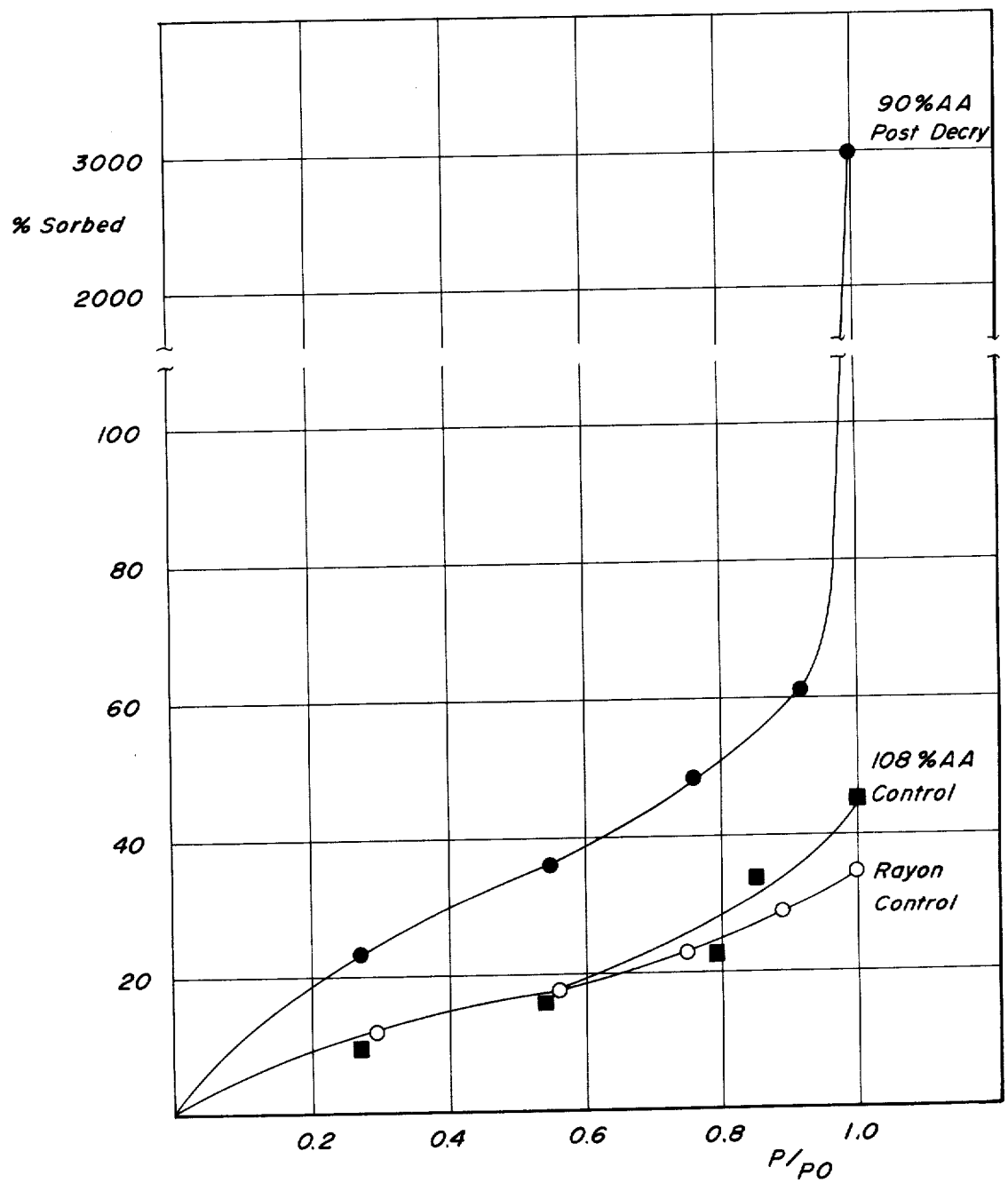

The cellulose-containing material may be graft-copolymerized with the hydrophilic group containing vinyl monomer according to any conventional method. For example, the graft-copolymerization can be initiated by suitable free-radical initiators such as ceric ion, ferrous ion-hydrogen perioxide, etc. According to the ceric ion method, the cellulose material and vinyl monomer are admixed and contacted with a salt such as ceric ammonium nitrate in an inert atmosphere such as nitrogen for a time sufficient to achieve grafting. In the ferrous ion-hydrogen perioxide initiation process, the cellulose material, a ferrous ammonium sulphate solution of monomer and hydrogen peroxide are admixed in an inert atmosphere such as nitrogen and allowed to stand for a time sufficient to achieve grafting. In the xanthation method the cellulose material is first lightly xanthated with carbon disulfide and sodium hydroxide. The cellulose xanthate is then treated with a trace of ferrous ion salt plus the monomer and hydrogen perioxide. The mixture is then left for sufficient time to achieve the desired degree of grafting.

The preferred method involves exposing the cellulose-containing material to high energy irradiation such as gamma rays from colbalt-60 in a dosage range of from about 0.1 to about 100 megarads, more preferably between about 0.1 and about 50 megarads. Although not essential, best results are obtained where the cellulose-containing material is first subjected to the high energy radiation and then admixed with the vinyl monomer for graft-copolymerization. It is preferred to carry out the irradiation while maintaining the cellulose-containing material under vacuum; however, irradiation can also be carried out under atmospheric conditions. The irradiation results in the formation of free radicals in the cellulose material which are capable of initiating grafting.

Following irradiation, the cellulose-containing material is admixed with an aqueous solution or emulsion of the hydrophilic group containing vinyl monomer. Preferably, the solution or emulsion contains from about 1 to about 80%, by weight, of monomer. Other additives such as dispersing, emulsifying agents, processing agents, etc., may be present in an amount up to about 30% by weight, based on the weight of the solution or emulsion.

Any vinyl monomer, dimer or oligomer capable of graft copolymerization with cellulose and which contains a hydrophilic group may be employed in the practice of the method of the invention. Suitable monomers include those disclosed in the above-cited references. By "hydrophilic group" is meant any group contained in the vinyl monomer which imparts hydrophilicity either to the homopolymerized product or its copolymerization product with a base material such as cellulose. Such hydrophilic groups are well known in the prior art. Suitable monomeric compounds for the practice of the invention include acrylic acid, methacrylic acid, acrylamide, hydroxyethylmethacrylate, vinyl pyrollidone, vinyl pyridine and mixtures thereof. It is to be understood, however, that any hydrophilic group containing vinyl monomer capable of graft copolymerization with cellulose may be employed in the practice of the invention.

It is preferred to conduct the graft copolymerization to the extent that the cellulosic material contains from about 30 to about 6000%, by weight, more preferably, from about 30 to about 500%, by weight, of grafted vinyl polymer, based on the weight of the ungrafted cellulosic material. Most preferably, the material contains about 100%, by weight, of the grafted polymer.

Although the graft-copolymerization onto the cellulosic material of the hydrophilic group containing vinyl monomer will result in some increase in hydrophilicity of the material as evidenced by the disclosures of the above-cited references, it is essential in order to radically increase the water absorptive properties of the cellulosic material to decrystallize the material following graft-copolymerization.

Following the graft-copolymerization step, the product is reacted with a decrystallizing agent in an amount and for a time sufficient to increase the water absorbency of the graft-copolymerized material. Generally, the graft-copolymerized product is immersed in an aqueous solution of the decrystallizing agent. Generally, solutions containing from about 15 to about 100 percent by weight of the decrystallizing agent are employed. The graft-copolymerized material is contacted with the decrystallizing agent for a period of time ranging from about 2 to about 120 minutes. Illustrative of suitable decrystallizing agents are zinc chloride, cupriethylene diamine, cupritetramine hydroxide, concentrated liquid ammonia, lithium hydroxide, benzyltrimethylammonium hydroxide, ethylamine, ethylenediamine, solutions of paraformaldehyde in dimethylsulfoxide and solutions of nigrogen tetroxide in dimethyl formamide. Where the decrystallizing agents are liquids, the graft-copolymerized product can be contacted directly therewith. Solid decrystallizing agents may be employed as aqueous or other solvent solutions thereof. It is to be understood that the above list of decrystallizing agents is only illustrative and that any agent capable of decrystallizing cellulose may be employed in the practice of the method of the invention. In cases where the decrystallizing agent results in the formation of e.g. copper or zinc salts better absorption is obtained when the material is washed with acid and changed to the sodium or pottasium salt with aqueous alkali.

To obtain highly water absorbent materials, it is essential that the decrystallization step be carried out subsequent to the graft-copolymerization step. Where decrystallization is employed prior to grafting, the cellulose will recrystallize during the graft-copolymerization step thereby resulting in a loss of hydrophilicity.

The exact mechanism involved in the method of the present invention is not completely understood. Although not wishing to be bound by any theory of operation, it is hypothesized that the greatly increased water absorption properties of the graft-copolymerized cellulosic material is due to (1) the hydrophilic groups containing in the graft-copolymerized material and to (2) the relative absence of crystalline regions in the cellulose material. Cellulosic fibers are made up of both amorphous and crystalline regions. Water molecules have difficulty penetrating into crystalline regions but penetrate readily into the amorphous regions of the cellulose. The crystalline regions due to strong forces of association resist the swelling action of water. The decrstallization operates to increase the amorphous area of the cellulose material, thereby increasing the water absorptivity.

Also, the graft-copolymerization of the vinyl monomer containing the hydrophilic groups which have an affinity for water results in a division or separation of the fibrous molecules so that the structure thereof is more susceptible to swelling with water. Furthermore, the bulky polymer chains grafted onto the cellulose prevent the cellulosic chains from recrystallizing when the material is allowed to dry. In any event, both graft co-polymerization with a hydrophilic group containing vinyl monomer and post-decrystallization of the cellulose material is required to achieve a higher degree of water absorption.

The method of the invention is applicable to any cellulose-containing material such as cotton, wood pulp, flax, rayon, cellophane, etc., which may be admixed with any suitable non-cellulosic material and formed into any suitable shape, such as fibers, films, slabs, spheres, etc.

The products produced by the method of the invention possess extremely high water absorption properties while maintaining their mechanical integrity. In addition, the thus treated materials are not "sticky" or "tacky" as is often observed with highly abosrbent materials.

The invention is illustrated by the following non-limiting examples:

EXAMPLE 1

0.2 gram of rayon yarn (150 denier) were placed in an evacuated glass ampoule ($10^{-5}$ mm. Hg.) for 24 hours. The samples were then irradiated in a cobalt-60 facility at a dose rate of 0.1 megarads/hours to a total dose of 11.75 megarads at 25° C. during irradiation, the sample was in contact with 20 ml of a degassed solution of 10 ml of acrylic acid and 10 ml of water containing $10^{-2}$ M $CuCl_2$ at 25° C. Following irradiation, the samples were removed and washed with water. The samples were then subjected to post-decrystallization by immersion in a 70% solution of zinc chloride in water for 2 hours at 40° C. Subsequently, the samples were washed in water and dired. The samples were found to contain 90% by weight of polyacrylic acid, based on the original weight of the rayon.

The water absorptivity of the graft-copolymerized material, a control sample containing 108% by weight of polyacrylic acid grafted thereon according to the method set forth above but not post-decrystallized and an identical rayon sample which had not been grafted nor decrystallized was determined according to the following procedure:

The sample was allowed to equilibrate in water for 30 minutes and then centrifuged at 500 rpm for 30 minutes. The centrifuge was equipped with a stainless steel frit which allowed the excess water to flow to the bottom of the tube. A cap on the centrifuge tube prevented the relative humidity from dropping below 100%. Finally, the percent of water absorbed was determined by weighing.

A comparison of the water absorption properties of the three samples is shown in FIG. 1. As is apparent, the rayon material treated in accordance with the method of the present invention results in a radically increased hydrophilicity.

EXAMPLE 2

0.2 gram of cellophane film (thickness of 2 mil) were degassed in a glass ampoule at $10^{-5}$ mm. Hg. for 24 hours and irradiated at 0.1 megarads/hour to a total dose of 9.0 megarads in the presence of 20 ml of a degassed solution of 10 ml acrylic acid and 10 ml of water containing $10^{-2}$ M $CuCl_2$ at 25° C. A cobalt-60 facility was employed for irradiation. Following irradiation, the samples were washed and dried and found to contain 46% by weight of polyacrylic acid grafted thereon. The samples were then subjected to a 70% zinc chloride solution for 2 hours at 40° C. and washed.

Figure 2:
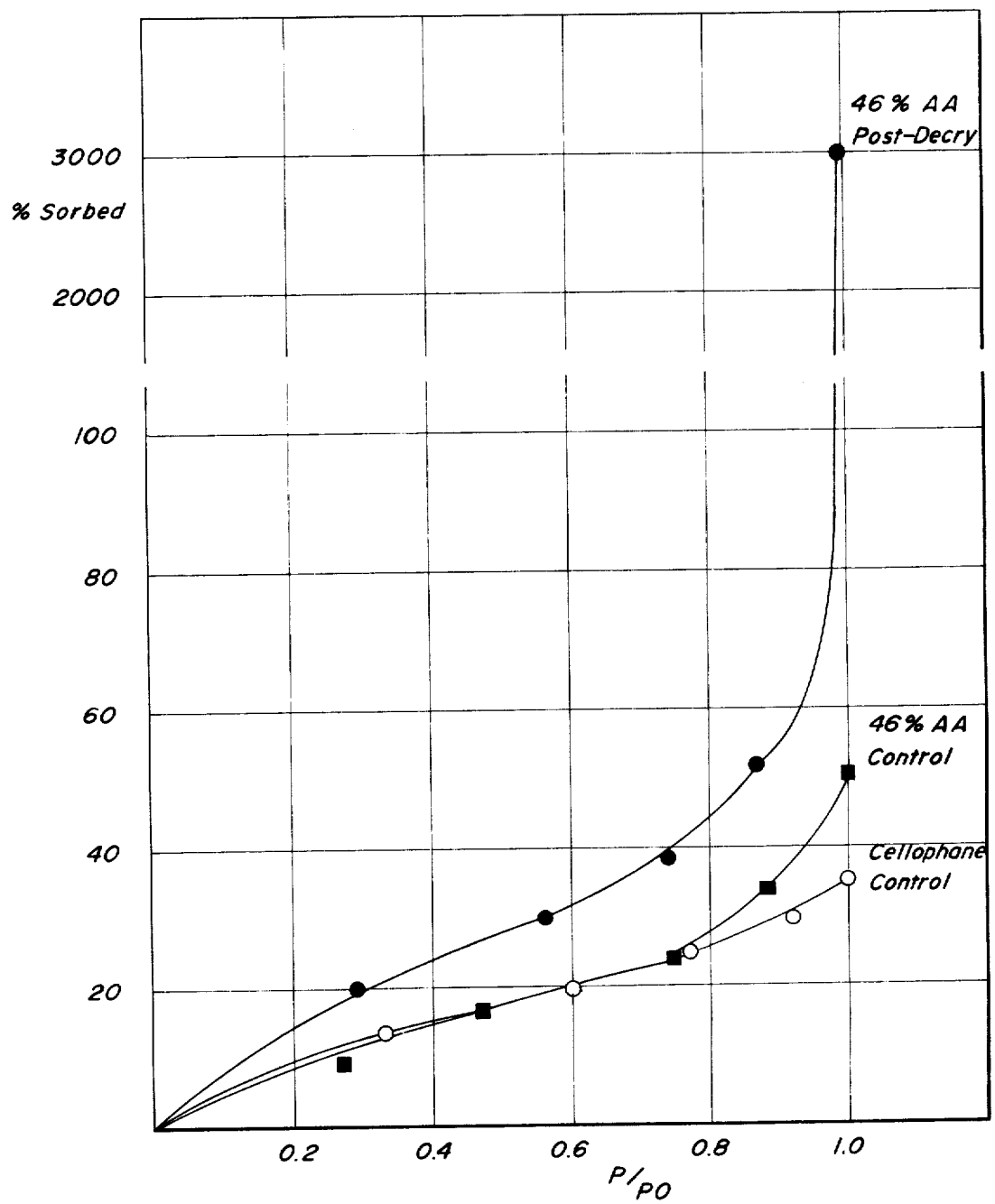

The water abosrption properties of the samples, as well as a similar sample which had been identically grafted but not post-decrystallized, and an equivalent amount of identical cellophane film were determined. The results are illustrated in FIG. 2. As is apparent, the cellophane film treated in accordance with the method of the invention has a high degree of water absorptivity as compared with the non-decrystallized material and the untreated cellophane material.

EXAMPLE 3

0.2 gram of rayon identical to that employed in Example 1 was graft-copolymerized with acrylic acid according to the manner described in Example 1. Following grafting, the samples were subjected to post-decrystallization employing a 25% solution of cupriethylene diamine for 15 minutes and then rinsed and dried. The sample was found to imbibe greater than 3200% by weight of water.

EXAMPLE 4

The procedure of Example 2 was followed except that the graft-copolymerized sample was post-decrystallized with a 25% solution of cupriethylene diamine for 15 minutes and then rinsed. The sample was found to be capable of absorbing in excess of 2800% by weight of water.

EXAMPLE 5

Cellophane film (0.2856 grams) was placed into a glass ampoule. A solution of 5 ml acrylic acid and 5 ml 0.06 $m$ $K_2S_2O_8$ (Potassium Persulfate) was added and diffused under vacuum. The sample was allowed to react in a thermostatted bath at 25° C for 24 hours. Afterwards, the sample was washed, dried, and weighed. Following grafting, the percent graft was determined to be 134% by weight. The sample was then subjected to post-decrystallization using Zinc chloride in water (7 gms $ZnCl_2$ + 3 ml $H_2O$) for 2 hours. Following decrystallization, the sample was found to absorb 2500% water according to the method outlined in Example 1.

EXAMPLE 6

Rayon yarn (0.21 grams) was grafted in a similar fashion as cellophane described in Example 5. After grafting, the sample was found to contain 252% graft. After post-decrystallization for 2 hours in 70% $ZnCl_2$(7 gm $ZnCl_2$ + 3 ml $H_2O$) the sample absorbed in excess of 2200% water.

EXAMPLE 7

Cellophane film (0.20 grams) was placed in a nitrogen flushed bottle containing 5 ml acrylic acid, $10^{-4}$ moles of $FeSO_4$, and $2 \times 10^{-4}$ moles $H_2O_2$, buffered to pH of 4.6. the sample was allowed to graft for 2 hours at 30° C. Afterwards, the grafting was determined to be 124% by weight. The same was then post-decrystallized for 2 hours in 70% $ZnCl_2$(7 gm $ZnCl_2$ + 3 gm $H_2O$). Following decrystallization the sample was found to absorb in excess of 2600% water.

EXAMPLE 8

2.0 grams of cotton fabric was xanthated for 20 minutes at 25° C. in a solution containing 40 grams of 5% NaCH, 2.8 grams $CS_2$, and 1.0 grams of Triton X-405. Afterwards, the sample was water washed and subsequently soaked in water containing 6 ppm of iron (Ferrous ammonium sulfate) for 15 minutes at 25° C. The sample was then washed, dried, and placed in a grafting solution containing 35.8 grams $H_2O$, 0.23 grams $H_2O_2$, and 18.3 grams methacrylic acid. The sample was allowed to graft in a sealed tube at 50° C. for 7 minutes. Following grafting, the sample was washed in water and dried. The sample was weighed and found to contain 58% graft based on the original weight of the fabric.

The sample was then subjected to post-decrystallization using zinc chloride in water (7 grams $ZnCl_2$ + 3 ml $H_2O$) for 2 hours. Following decrystallization, the sample wash found to absorb 2400% water according to the method described in Example 1.

EXAMPLE 9

The procedure of Example 8 was followed except the grafted sample was post-decrystallized with a 25% solution of cupriethylene diamine for 30 minutes and rinsed. The sample was found to absorb 2600% water following decrystallization.

We claim:

1. In a process for imparting water-absorbent properties to a cellulose-containing material by graft-copolymerizing onto said material at least one vinyl monomer containing a hydrophilic group the improvement comprising treating said graft-copolymerized material with a decrystallizing agent for cellulose in an amount and for a time sufficient to increase the water absorbency of the graft copolymerized material.

2. The process of claim 1 wherein said graft-copolymerization is effected in the presence of high energy radiation.

3. The process of claim 2 wherein said material is subjected to high energy radiation prior to said graft-copolymerization.

4. The process of claim 3 wherein the irradiation dose is in the range of 0.1 to 100 megarads.

5. The process of claim 3 wherein the irradiation dose is in the range of 0.1 to 50 megarads.

6. The process of claim 1 wherein said vinyl monomer is selected from the group consisting of acrylic acid, methacrylic acid, acrylamide, hydroxyethylmethacrylate, hydroxy ethyl acrylate, vinyl pyrollidone, vinyl pyridine, vinyl alkyl ether, maleic anhydride, poly maleic acid half esters, polystyrene sulfonic acid.

7. The process of claim 1 wherein the amount of vinyl monomer copolymerized onto said material is at least 30% by weight, based on the weight of the material.

8. The process of claim 1 wherein the decrystallizing agent is selected from the group consisting of zinc chloride, cupriethylene diamine, cupritetramine hydroxide, concentrated liquid ammonia, lithium hydroxide, benzyltrimethylammonium hydroxide, ethylamine and ethylenediamine, a solution of paraformaldehyde in dimethyl sulfoxide and nitrogen tetroxide in dimethyl formamide.

9. The process of claim 1 wherein said cellulose material is rayon. graft-copolymerization.

10. The process of claim 1 wherein said cellulose material is cotton.

11. The process of claim 1 wherein said cellulose material is cellophane.

12. In a process for imparting water-absorbent properties to a cellulose-containing material by graft-copolymerizing onto said material at least one vinyl monomer containing a hydrophilic group, the improvement comprising effecting said graft-copolymerization after irradiating said material with a dose of 0.1 to 100 megarads of high energy radiation and then treating said material with a decrystallizing agent for cellulose in an amount and for a time sufficient to increase the water-absorbency of the graft-copolymerized material, wherein the amount of vinyl monomer copolymerized onto said material is at least about 30%, by weight, based on the weight of the material.

13. The process of claim 1 wherein said graft-copolymerization is effected in the presence of a free-radical initiator.

14. The process of claim 13 wherein said initiator is ceric ion.

15. The process of claim 13 wherein said initiator is ferrous ion-hydrogen peroxide.

16. The process of claim 13 wherein the initiation is achieved by xanthation followed by treatment with ferrous ion and hydrogen peroxide.

17. The product produced according to the process of claim 1.

* * * * *